United States Patent Office 3,432,671
Patented Mar. 11, 1969

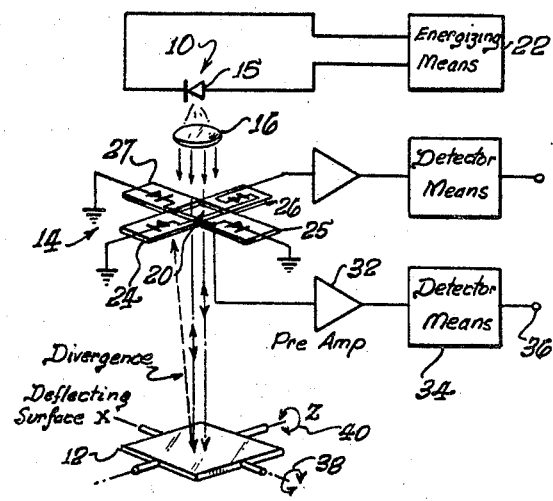

3,432,671
SOLID STATE OPTICAL PICKOFF EMPLOYING
PLANAR CRUCIFORM DETECTOR
Thomas Rhys Edmonds, Woodland Hill, Calif., assignor to Conductron Corporation, Ann Arbor, Mich., a corporation of Delaware
Filed Apr. 14, 1965, Ser. No. 448,012
U.S. Cl. 250—217
Int. Cl. G02f 1/34
3 Claims

ABSTRACT OF THE DISCLOSURE

A solid state sensor employing an array of photocells in a cruciform configuration and forming an aperture. The array of photocells is centered on an optical axis which also has a solid state radiant energy source and reflecting surface located thereon.

---

This invention relates to an optical pickoff or sensor. In particular, this invention relates to the novel arrangement of a solid state radiant energy means and an array of photocells.

In general, the term optical sensor, as employed herein, refers to a device utilizing radiant energy to detect or transduce movement or some other characteristic of a body. It has been the common practice in optical sensor arrangements to employ incandescent or filament light sources, prisms, lenses and associated photo-sensitive devices. Such combinations have suffered from a number of short-comings. Namely, filament light sources generate sufficient heat to contribute substantially to the null instability of the arrangement. Sources, such as tungsten filament sources, prevent high frequency modulation (over 1 kc.) because of the persistant radiation from the heated filament subsequent to its de-energization. The inability to operate at such frequencies minimizes the possibility of practically employing AC preamplifiers along with their low drift gain characteristics. The required low frequency operation facilitates low frequency drift and noise effects. The filament sources also have a limited life and are relatively fragile with poor tolerance for vibration and acceleration. Finally, the cost of prior art optical pickoffs has been relatively high.

The foregoing problems and disadvantages are overcome by this invention which provides a long life reliable, stable low cost radiant energy sensor which is capable of detecting movement or other characteristics along two axes. These advantages are accomplished by a single compact unit which includes solid state radiant energy means for transmitting collimated radiant energy and a plurality of photocells arranged to permit radiant energy to pass therethrough to a body having a reflecting surface and arranged to detect any reflected energy from the reflecting surfaces. A more specific detail of the invention is the arrangement of the photocells in a cruciform with a square aperture formed at the center of the cruciform by the edges of the photocells. The photocells are located intermediate the solid state radiant energy means and a reflecting surface.

The use of solid state radiant energy means and a solid state photocell provides a reliable, stable, compact, rugged and long life device. The life of a solid state radiant energy means, such as a laser diode, is indefinitely long. The photocells have a similar life span. Both the laser diode and the photocell are relatively insensitive to acceleration and vibration. Only a simple lens system is needed to collimate the radiant energy sufficiently for use. This facilitates compactness, low cost and simplicity. The laser diode generates a minimum of heat and may be modulated at relatively high frequency (in excess of 1 kc.). This facilitates stability by minimizing thermal drift, low frequency drift and noise effects resulting from sources such as cell aging, cell drift and others. The laser diode and photocell arrangement is also compatible with AC high frequency preamplifiers. Nothwithstanding all of the advantages arising from the laser diode, photocell arrangement, the cost is surprisingly low. It is estimated that in reasonable production quantities costs will be lower than similar performance prior art devices by an order of magnitude.

The above structure and advantages can be readily understood from the detail specification which follows taken in conjunction with the drawings wherein:

FIGURE 1 is a simplified schematic drawing of the invented optical sensor arrangement;

FIGURES 2a–f are a series of simplified plan views showing the manner in which radiant energy is reflected from a reflecting surface to the photocells as the reflecting surface changes its orientation and the resulting signals;

FIGURE 3 is a cross-sectional view of the optical sensor assembly; and,

FIGURE 4 is an end view of the sensor assembly of FIGURE 3 showing the photocell arrangement in more detail.

Referring to FIGURE 1, the optical sensor comprises a radiant energy means 10 for emitting and transmitting radiant energy, a reference or reflecting surface 12 which is not an actual part of the pickoff, and an array of photocells 14 intermediate the radiant energy means 10 and the reflecting surface 12. The photocells 14 are arranged to permit light to pass therethrough to reflecting surface 12 and then return to the array of photocells 14. The radiant energy means 10 is preferably a laser diode such as a gallium arsenide diode. Laser diodes are commonly available from semiconductor manufacturers such as General Electric, and marketed under the designation LED 10. Such a diode provides a substantial portion of its radiant energy output in the infrared region with the emitted radiant energy non-coherent and collimated to a certain extent. The emitted energy may be further collimated and shaped by a lens and aperture arrangement, such as the lenses 64 and 66 (FIGURE 3).

The laser diode 15 may be energized by direct or alternating energizing means, such as energizing means 22. Preferably, the energizing means 22 is an alternating signal power source which provides an alternating signal having a frequency of convenient magnitude or determined by the application requirements. In one form of the invention, a signal in excess of 1 kc. is employed and, preferably, a signal having a frequency in the range of 4.5 kc. is employed.

It should be understood that other solid state means for supplying radiant energy, such as germanium or silicon devices, and others may be employed in the invented arrangement so long as sufficient useful radiant energy is emitted. It is also within the broad scope of the invention to employ filament light sources. The term radiant energy as employed in this specification includes at least ultraviolet, visible, infrared and X-ray wavelengths. The term laser refers to any device where radiant energy is emitted as a result of atomic or energy level transitions, changes or alterations.

The photocell array 14 comprises a plurality of photocells 24 through 27 arranged to form an aperture 20. This is accomplished by arranging the photocells 24 to 27 in a cruciform shape with the corners of adjacent photocells in close proximity to one another with one edge from each photocell forming part of the perimeter of aperture 20. The aperture 20 has a square shape serving, as described above, to shape the pattern of the radiant energy projected from laser diode 15 onto the reflected surface. The radiant energy thus impinging upon surface 12 has a substantially square configuration. It is within the broad scope of the invention to use other configurations. The use of the photocells as an aperture provides a self-compensating effect. For example, if the aperture is distorted by temperature changes or other forces, the pattern of the radiant image will change and location of the photocell array which senses the reflected radiant energy will also change in a manner to compensate for this aperture change.

The photocells 24 to 27 may take the form of photoconductors, photo-transistors, photoemissive devices, photo-field effect transistors, photovoltaic devices operated in the storage or photovoltaic mode or any other device that exhibits a change of electrical characteristics upon exposure to radiant energy. One practical configuration employs photocells 25 to 27 that are silicon diodes operated in the photovoltaic mode and adapted for maximum response at the wavelength of the emitted radiant energy. The diodes are connected in pairs 25, 27 and 24, 26. The diode pair 25 and 27 are located for Z axis sensing while the diode pair 24 and 26 are connected for X axis sensing. The connections and circuit elements relating to diodes 5 and 27 are specifically described below. It should be understood that the diodes 24 and 26 are identically connected and connected to the same type of circuit elements.

The anode of diode 25 and the cathode of diode 27 are connected to a common point which is shown as ground (FIGURES 1 and 4). The cathode of diode 25 and the anode of diode 27 are also connected to a common point which in turn is connected to a preamplifier 32. The preamplifier 32 may take the form of a conventional AC amplifier but it is preferably a monolithic integrated circuit AC amplifier, such as a modification of the operational amplifier described in the publication "The Improved A–702 Wide Bank DC Amplifier" by R. G. Widlar, Application Bulletin, Fairchild Semiconductor, January 1965.

The preamplifier 32 is connected to a detector means 34 for providing an output signal at the output terminal 36 which is indicative of the amount of radiant energy falling on the diodes 25 and 27. When the energizing means 22 energizes the diode 15 with an alternating signal, the detector means 34 may take the form of a phase sensitive detector circuit which generates a DC signal having an amplitude proportional to the amplitude of the signals supplied by the photocells 25 and 27 and a polarity indicative of the phase of the signal supplied by the photocells. Such phase detector circuits are well known in the art and it is conventional to operate such phase detector means at essentially the same frequency as the frequency at which the laser diode 15 is energized. This frequency serves as a reference frequency in the detector circuits. These circuits are commonly employed in AC suppressed carrier servo systems.

The radiant energy passing through aperture 20 of the photocell array 14 is directed at reflecting surface 12 which may take the form of any type of reflective coating but is preferably a mirrored surface. The surface 12 is mounted to tilt along two axes, the X and Z axis. One means for mounting the surface 12 is shown in U.S. patent application Ser. No. 447,993 filed by Joe Bartlett Kennedy and Thomas Rhys Edmonds and assigned to the assignee of this application. The arrow 38 indicates tilting around the X axis and the arrow 40 indicates tilting around the Z axis. The photocells 25 and 27 detect tilting about the Z axis while photocells 24 and 26 detect tilting about the X axis. The radiant energy passing through aperture 20 takes a square form which experiences a divergence in passing from the aperture 20 to reflecting surface 12 and then returning to the photocell array 14. This is clearly seen in FIGURE 2a where the image of the radiant energy 42 is shown as a square area superimposed and symmetrically located over the aperture 20. This illustrates the situation when the reflecting surface 12 is essentially parallel to the array 14.

Referring to FIGURES 1 and 2, the operation of the optical pickoff can now be readily understood. The laser diode 15 is energized with a signal having alternating characteristics to transmit radiant energy to the reflecting surface 12. The radiant energy is collimated by lens 16 and aperture 20 masks it into a square form. The radiant energy striking upon surface 12 is reflected to photocell array 14. When the reflecting surface is parallel to the plane which the photocell array 14 is located on, then equal radiant energy will fall on each of the photocells. When this occurs a current will pass through each of the diodes which is substantially equal in amplitude, but the current through the diodes of a connected pair is 180° out of phase. For example, with an equal amount of radiant energy incident on diodes 25 and 27 (which is typically the case when reflecting surface 12 is parallel to diodes 25 and 27) then the diode 25 would pass a signal as shown in FIGURE 2b, and designated as 25 while the diode 27 would pass a signal designated as 27 in FIGURE 2b. Since the amplitudes of these signals is substantially equal, the resultant signal transmitted to the preamplifiers is a constant or substantially zero. Thus, it can be seen that the diodes 25 and 27 are connected to transmit a difference signal to preamplifier 32. It should be understood that the photocells 24 and 26 are connected and operate in the same manner as diodes 25 and 27.

When the reflecting surface 12 tilts, the radiant energy reflected by reflecting surface 12 will no longer symmetrically overlay the photocell array 14. As shown in FIGURE 2c, the reflecting surface 12 has tilted in a clockwise direction around the X axis and virtually no tilting around the Z axis. Under these circumstances it can be seen that the radiant energy falling on photocell 25 and 27 is still substantially equal. The radiant energy on photocell 26 is substantially greater than that falling on photocell 24. The signal transmitted by photocells 25 and 27 to amplifier 32 will remain substantially zero as shown in FIGURE 2b. The signal generated by a photocell 26 is substantially greater in amplitude than the signal generated by photocell 24 as shown by the broken line curves in FIGURE 2d. This provides a resultant R being transmitted to preamplifier 32. The amplitude of this signal indicated the difference in the quantity of radiant energy falling on the two photocells 24 and 26 which in turn indicates the degree of tilt or rotation of reflecting surface 12. The phase of the resultant R indicates the direction of the tilt or rotation.

The radiant energy image falling upon photocell array 14 when the reflecting surface 12 tilts about the X axis in a counterclockwise direction is shown in FIGURE 2e. The radiant energy falling on the photocell 24 is substantially greater than that falling on photocell 27 while the radiant energy falling on photocells 25 and 27 is substantially equal. This results in the signal from photocells 25 and 27 being substantially zero as shown in FIGURE 2b. The amplitude of the signal transmitted from photocell 24 is substantially greater than the amplitude of the signal from photocell 26 resulting in the waveform R shown in FIGURE 2f. The waveform 24 is representative of the output signal from photocell 24 while the waveform designated 26 is representative of the output signal from photocell 26. The resultant waveform R is the signal supplied by the photocells to the associated preamplifier. It should be noted that this signal is approximately 180° out of phase with the signal supplied by the photocells to the preamplifier when the reflecting surface 12 is tilted in the opposite direction as shown in FIGURES 2c and 2d. Thus, the phase (with respect to the signal exciting the radiant energy source) of the signal supplied to the preamplifier is representative of the direction of tilt while the amplitude of the signal is representative of the magnitude of this tilt.

The detector means 34 receives the signal from the preamplifier 32 and supplies a DC level output signal having a polarity dependent upon the phase of the input signal. A positive signal may be provided when the phase is such as shown in the resultant curve R of FIGURE 2d and a negative polarity pulse may be provided when the phase is such as shown in the resultant curve R of FIGURE 2f. The amplitude of the pulse provided by detector means 34 is proportional to the amplitude of the waveform of the resultant waveform.

A sensor constructed in accordance with the invention has been tested and the following performance data obtained: Resolution—1 arc second or less; operating range—0.5 to 1.5 inches; linear range—plus or minus 3°; acquisition range—plus or minus 7°; sensitivity—5 millivolts per arc second (minimum); power input—15 volts DC, 3 watts; sensor size—⅝" in diameter, ¾" length. This performance is obtained along with stability, reliability, compactness, simplicity, ruggedness, and low cost construction.

The mechanical details of the sensor assembly are shown in FIGURES 3 and 4. Referring to FIGURE 3, the assembly comprises a cylindrical holder 50 which has photocell array 14 located at its front end adjacent lens assembly 52. The photocell array 14 comprises photocells 24–27 fixed by cementing to a ceramic annular disc 54. As shown in FIGURE 4, the photocells 24–27 are rectangular in shape with their corners separated by a very small distance, such as 0.002–0.005 inch. The contact to the anode is on one side of the photocell while the contact to the cathode is on the other side of the photocell. Thus, the lead 56 passes around the perimeter of annular disc 54 to connect an anode and cathode and not interfere with the transmission of light via aperture 20. In a similar manner the lead 58 connects an anode and cathode. One of these leads is connected to ground while the other is connected to a preamplifier. The photocells 25 and 27 are connected in a similar manner by the leads 60 and 62. It is within the broad scope of the invention to employ an integrated photocell arrangement, that is an arrangement wherein the photocell array is formed by a simple crystal with the individual cell isolated by dielectric isolation, junction isolation or other isolation techniques. The aperture in such arrangement may be formed by photoengraving and etching, or by appropriate mechanical machinings and forming. The contacts in an integrated arrangement are formed by well known metallizing techniques such as discussed in U.S. Patent No. 2,981,877.

The lens assembly 52 includes a pair of lenses 64 and 66 secured by fastening means, such as cement, to holder 68. The lens assembly is aligned with the center of aperture 20 by the construction of holders 50 and sensors to collimate the radiant energy from diode 15.

The laser diode 15 is mounted in an adjustable assembly 70 which facilitates adjustment of the center of the emitted radiant energy so that its center is coincident with the center of aperture 20. The adjustable assembly 70 comprises cylindrical hollow holder 72 with an opening 74 adapted to receive the body of laser diode 15 but having a diameter smaller than the disc seat of diode 15. The disc 76 abuts the surface adjacent opening 74 so as to fix the axial position of a diode 15. Set screws 78–81 threadingly engage the holder 50 with their ends abutting the cylindrical holder 72. The adjustment of the set screws will in turn adjust the transverse position of the holder 72 and the position of diode 15. This enables the center of the radiant energy emitted by laser diode 15 to be adjusted to coincide with the center of aperture 20. Once the diode 15 is adjusted to the desired position the opening 76 in holder 50 is filled with epoxy resin or other suitable material to secure the setting of the set screws and to firmly hold the assembly 70 in the holder 50. It should be noted that the opening 78 of cylindrical holder 72 may be filled with epoxy resin prior to its insertion into cooperative relation with the set screws 78–81. This enables diode 15 to be secured in holder 72 while the set screws are adjusted.

From the above description of the mechanical details of the optical sensor arrangement it can be seen that a solid, rugged, compact structure may readily be fabricated by employing the invented arrangement. This construction is relatively simple, reliable, contains no moving parts, may be fabricated at relatively low cost and senses movement along two axes. In summary, an optical sensor arrangement has been provided which overcomes the disadvantages and shortcomings of prior art devices and does so with minimum complexity and at a minimum cost consistent with relatively high performance.

Although this invention has been disclosed and illustrated with refrence to particular applications, the principles involved are susceptible of numerous other applications which will be apparent to persons skilled in the art. For example, it is within the scope of the invention to employ the invented phases for sensing linear displacement. That is, the reflecting surface may be moved to and from the pickoff along an axis perpendicular to the sensor and the surface. In such an arrangement the sensor would function as a one axis sensor with a redundant signal. The invention is, therefore, to be limited only as indicated by the scope of the appended claims.

What is claimed is:

1. A solid state radiant energy sensor comprising:
    a solid state laser means for emitting collimated radiant energy located along an optical axis for emitting said energy along said axis;
    a planar reflecting surface mounted for two axis movement with its planar surface substantially perpendicular to said optical axis to receive radiant energy from said laser means and to reflect said received radiant energy in a direction toward said laser means and substantially parallel to said optical axis when said planar surface is substantially perpendicular thereto;
    a planar array of photocells intermediate said laser means and said reflecting surface and arranged in a cruciform to form a substantially planar aperture which passes collimated radiant energy to said reflecting surface and receives radiant energy reflected from said reflecting surface, said cruciform having at least two photocells along a first axis and at least two photocells along a second axis, said photocells along a first axis sensing radiant energy changes resulting from said reflecting surface moving about one axis and said photocells along a second axis sensing radiant energy changes resulting from said reflecting surface moving about said other axis, said photocells having adjacent edges located to form said aperture, said planar array substantially perpendicular to said optical axis and substantially centered with respect to said radiant energy reflected by said reflecting surface when said reflecting surface is perpendicular to said optical axis;
    energizing means for energizing said solid state means with a signal having an alternating characteristic;
    first detector means coupled to said photocells along said first axis for detecting a signal from said photocells representative of the direction of movement of said reflecting surface about one axis and the extent of said movement about said axis; and
    a second detector means coupled to said photocells along a second axis for detecting a signal from said photocells representative of the direction of movement of said reflecting surface about the other axis and the extent of said movement about said axis, whereby a two axis solid state optical sensor is provided.

2. The sensor defined in claim 1 wherein said energizing means operates at a frequency of at least 1 kc.

3. The sensor defined in claim 2 wherein said solid state laser means is a semiconductor device and said photocells are semiconductor devices.

References Cited

UNITED STATES PATENTS

| | | |
|---|---|---|
| 3,197,643 | 7/1965 | Morris. |
| 3,223,846 | 12/1965 | Rochester _____ 250—230 X |
| 3,277,304 | 10/1966 | Vyce. |
| 3,283,408 | 11/1966 | Rothe et al. |
| 3,304,430 | 2/1967 | Biard et al. |
| 3,316,800 | 5/1967 | Kibler. |
| 3,323,408 | 6/1967 | Bishop et al. |
| 3,351,493 | 11/1967 | Weiman et al. |
| 3,354,316 | 11/1967 | Deverall. |

OTHER REFERENCES

"Infrared and Visible Light Emission from Forward-Biased P-N Junctions," by R. H. Rediker, Solid/State/Design, August 1963, pp. 19–28, 250–217SSL.

"Optical Coupling," by Gilleo et al., Electronics, Nov. 22, 1963, pp. 23–27, 250–211J.

"P-N Junctions as Radiation Sources," by Lamorte et al., Electronics, vol. 37, No. 20, July 13, 1964, pp. 61–65, 250–217SSL.

RALPH G. NILSON, *Primary Examiner.*

M. A. LEAVITT, *Assistant Examiner.*

U.S. Cl. X.R.

250—211, 216, 230; 88—14